United States Patent [19]

Oakes, deceased

[11] Patent Number: 4,473,115
[45] Date of Patent: Sep. 25, 1984

[54] METHOD FOR REDUCING HYDROGEN SULFIDE CONCENTRATIONS IN WELL FLUIDS

[75] Inventor: David T. Oakes, deceased, late of Norman, Okla., by Evalyn B. Oakes, administrator

[73] Assignee: Bio-Cide Chemical Company, Inc., Norman, Okla.

[21] Appl. No.: 431,181

[22] Filed: Sep. 30, 1982

[51] Int. Cl.$^3$ .......................... E21B 7/00; E21B 47/00
[52] U.S. Cl. .................................. 166/250; 166/244 C; 166/310; 166/371; 175/40; 175/64; 210/754; 252/8.5 R; 252/8.55 E; 423/224
[58] Field of Search ......................... 175/64, 66, 40, 50; 166/244 C, 250, 310, 371; 60/641.2; 210/754; 252/8.5 R, 8.5 A, 8.5 B, 8.5 M, 8.55 E; 423/224, DIG. 19

[56] References Cited

U.S. PATENT DOCUMENTS

| | | | |
|---|---|---|---|
| 3,082,146 | 3/1963 | Wentworth et al. | 210/754 X |
| 3,123,521 | 3/1964 | Wentworth et al. | 210/754 X |
| 3,996,135 | 12/1976 | Stanford et al. | 210/754 |
| 4,077,879 | 3/1978 | Smeck | 210/754 |
| 4,147,212 | 4/1979 | Tisdale | 252/8.5 B X |
| 4,151,260 | 4/1979 | Woertz | 423/224 |
| 4,163,044 | 7/1979 | Woertz | 423/224 X |
| 4,252,655 | 2/1981 | Carney | 252/8.5 A X |
| 4,310,425 | 1/1982 | Key et al. | 252/8.5 A |
| 4,374,106 | 2/1983 | Tipton et al. | 60/641.2 X |

*Primary Examiner*—George A. Suchfield
*Attorney, Agent, or Firm*—Christopher H. Morgan

[57] ABSTRACT

A method for reducing concentrations of hydrogen sulfide present in subterranean well fluids by injection of a stabilized solution of chlorine dioxide. The stabilized chlorine dioxide solution is introduced into the subterranean well by injecting the solution through the well bore. This method also includes the reduction of the hydrogen sulfide content in drilling mud which has been contaminated by hydrogen sulfide present in a hydrocarbon well by mixing a stabilized solution of chlorine dioxide with the drilling mud. This method requires the preparation of a stabilized chlorine dioxide solution, a determination of the approximate amount of hydrogen sulfide which might be brought to the surface by the drilling mud and the introduction of the predetermined amount of stabilized chlorine dioxide solution into the drilling mud.

12 Claims, No Drawings

METHOD FOR REDUCING HYDROGEN SULFIDE CONCENTRATIONS IN WELL FLUIDS

BACKGROUND OF THE INVENTION

1. Field of the Invention

This invention relates in general to methods for reducing hydrogen sulfide concentrations in subterranean well fluids, and more particularly to methods of reducing hydrogen sulfide concentrations in subterranean well fluids by means of chlorine dioxide.

2. Description of the Prior Art

It is well known that hydrogen sulfide present in well fluids is a serious problem in the process of drilling and treating of wells. The presence of hydrogen sulfide also creates problems in the production steps when the well has been completed. Most significantly, hydrogen sulfide gas is extremely toxic such that those around the well or the produced well fluids must avoid breathing these toxic fumes. Often the toxic hydrogen sulfide is carried to the surface by drilling mud and this mud releases the toxic gas to the atmosphere. Of course, this makes the area around the well extremely hazardous. Furthermore, hydrogen sulfide is also a very corrosive agent such that it damages the tubing of the well and the containers which hold the produced well fluid. Also, hydrogen sulfide is a very reactive chemical and reduces the life of polymers and starches which are added to increase the viscosity of treating fluids of various types which are injected into the well. Finally, if hydrogen sulfide escapes into formations around the well, water contamination and the like can occur.

These and other problems are well known and a wide variety of scavenging agents have been used in an attempt to convert the hydrogen sulfide into non-toxic chemicals. For example, a recent article entitled "Chemical Scavengers for Sulfide in Water-Based Drilling Fluids" in the June, 1979 *Journal of Petroleum Technology* discusses the problem of hydrogen sulfide drilling and the reaction chemistry of commercial scavengers presently available for water-based drilling fluids. It states that there are three basic classes of scavengers in use at the present time, namely copper-based chemicals, zinc-based chemicals and iron-based chemicals. An example of a copper-based scavenger is copper carbonate. An example of an zinc-based scavenger is zinc carbonate. An example of an iron-based scavenger is iron oxide. Each of the scavengers has serious problems such that, as stated by the article, "we conclude that no commercial scavenger now is satisfactory for current needs."

While chlorine dioxide has been used in reducing hydrogen sulfide in well fluids, this use has largely been abandoned because of serious disadvantages and hazards in adding chlorine dioxide to the well fluids. This hazard stems primarily from the fact that chlorine dioxide is a toxic gas and is spontaneously explosive in concentrations above 10% in the atmosphere. Accordingly, it is extremely dangerous to produce, transport and use.

For example, U.S. Pat. No. 4,077,879 to Smeck, describes a process for purifying aqueous solutions containing hydrogen sulfide wherein chlorine dioxide is added to the solution in specific amounts and rates to avoid formation of colloidal sulfur. It states that one use for this process is in reducing hydrogen sulfide in well fluids. In the Smeck process, chlorine dioxide gas is added to the subject liquid to reduce the sulfide in the liquid. This is not satisfactory, however, since it requires generation systems for chlorine dioxide to be located at the well site. Alternatively, it requires the chlorine dioxide gas to be transported to the well in a gas container and then metered through a gas metering system into the well fluid at a specified rate. Here again, this method is so dangerous that it is operationally not feasible. Furthermore, this method does not add sufficient amounts of chlorine dioxide to the drilling fluid such that hydrogen sulfide gas can be prevented from reaching the surface. Since this is the most dangerous aspect of the presence of hydrogen sulfide gas, the Smeck patent fails in the most important regard. This failure is due to the inability to dissolve a large enough proportion of chlorine dioxide in the fluid. The present invention overcomes this problem.

Other oxides such as hydrogen peroxide have been used in reducing the hydrogen sulfide content in steam or drilling steam as shown in U.S. Pat. Nos. 4,163,044 and 4,151,260 to Woertz. However, hydrogen peroxide acts in a different manner than chlorine dioxide in oxidizing hydrogen sulfide in drilling mud.

Although stabilized chlorine dioxide solutions have been used for reducing bacteria in water and the like, they have not been used for reducing hydrogen sulfide content in well fluids. Examples of methods for making aqueous chlorine dioxide solutions are shown in U.S. Pat. Nos. 2,701,781, 3,271,242 and 3,278,447. For purposes of reference, the disclosure of these three patents is hereby incorporated in this disclosure. These three patents describe methods and compositions which allow chlorine dioxide solutions to contain chlorine dioxide in the range of 2% to 6% by weight of the solution. By "potential" chlorine dioxide it is meant that the solution can produce free chlorine dioxide when added to a solution wherein an oxidation-reduction reaction occurs.

SUMMARY OF THE INVENTION

It is accordingly an object of the present invention to provide an improved method of reducing hydrogen sulfide concentrations in well fluids.

It is also an object of the present invention to produce an improved method of reducing hydrogen sulfide concentrations in drilling mud used in the process of drilling a subterranean well.

Accordingly, the present invention comprises forming a treating fluid which comprises a stabilized, aqueous solution with the potential for forming chlorine dioxide on demand. This treating fluid is hereinafter referred to as a stabilized chlorine dioxide solution. This treating fluid is introduced into the subterranean well fluids containing hydrogen sulfide such that the hydrogen sulfide content in the well fluids is reduced. Preferably, the potential chlorine dioxide is present in the stabilized chlorine dioxide solution in the range of about 2% to about 6% by weight of the stabilized chlorine dioxide solution.

In reducing the hydrogen sulfide content in drilling mud, a stabilized chlorine dioxide solution having chlorine dioxide potential present in said solution in the range of about 2% to about 6% by weight is prepared. After determining the approximate amount of hydrogen sulfide which might be brought to the surface in the drilling mud, the stabilized chlorine dioxide solution is introduced into the drilling mud to form a drilling mud composition having at least one mole of potential chlorine dioxide per mole of hydrogen sulfide as determined.

Preferably, said stabilized chlorine dioxide solution is prepared by adding separately to water: (1) a source of active oxygen selected from the group consisting of ozone, hydrogen peroxide, calcium magnesium, sodium and urea peroxide, and alkali metal perborate, persulfate and perphosphate; (2) a salt of the group consisting of alkali metal carbonate and bicarbonate and alkali metal borate, sulfate and phosphate; and (3) chlorine dioxide gas being added by bubbling it through said solution. The amount of active oxygen in the source of active oxygen is substantially less than 0.2 parts by weight per part of the salt.

For a further understanding of the invention and further objects, features and advantages thereof, reference may now be had to the following detailed description of the invention. Many other processes in which the present invention will be useful are well within the purview of the skilled artisan and these processes will become more apparent from the following detailed description.

DESCRIPTION OF PREFERRED EMBODIMENTS

In accordance with the present invention, a stabilized, aqueous chlorine dioxide solution is added to a well fluid, such as drilling mud, to reduce the hydrogen sulfide contained in the fluid. This addition of a stabilized, aqueous chlorine dioxide solution differs in several important ways from the addition of chlorine dioxide gas or unstabilized chlorine dioxide solutions to such well fluids.

Mainly, the stabilized chlorine dioxide solutions allow a larger proportion of potential chlorine dioxide to be present in the solution. Thus, a stabilized chlorine dioxide solution can contain potential chlorine dioxide up to about 6% by weight of said solution. This additional potential chlorine dioxide reduces the volume of the solution which must be added to the well fluid. Moreover, unstabilized solutions of chlorine dioxide are highly corrosive and give off toxic fumes.

Prior to this invention, even if the entire well fluid were replaced with a safe unstabilized solution of chlorine dioxide, the chlorine dioxide would not be sufficient to reduce the toxic hydrogen sulfide in most wells. Accordingly, it has not been utilized for reducing the hydrogen sulfide in well fluids in most wells.

It is not practical to add sufficient chlorine dioxide in the gas phase to the well fluid since, in the gas phase, not enough of the chlorine dioxide combines with the hydrogen sulfide. This is because the gas phase does not contact and mix sufficiently with the well fluid. Further, gas phase chlorine dioxide reacts with ferrous metals to form oxides at a rapid rate. Here again, the addition of stabilized, aqueous chlorine dioxide solution introduces the maximum amount of chlorine dioxide to the well fluid such that chlorine dioxide can practically be used for reducing the hydrogen sulfide in the well.

A stabilized solution of chlorine dioxide mixes with the well fluid such that there can be a complete reaction of the chlorine dioxide with the hydrogen sulfide. Furthermore, a stabilized, aqueous chlorine dioxide solution is easily transported, is much easier and safer to add to the well fluid than gaseous chlorine dioxide. In addition, the aqueous stabilized chlorine dioxide solution is non-explosive and non-flammable. For example, the stabilized chlorine dioxide can be prepared at a chemical plant, stored for years if necessary, and then transported to the well site and added to the well fluid.

Another advantage of stabilized, aqueous chlorine dioxide is that it produces only very limited environmentally harmful effects, if at all, if it is spilled or if the solution escapes into an underground drinking water formation.

Yet another advantage is provided in that stabilized, chlorine dioxide solutions increase the life of polymers and starches which are often present in the well fluid. This increased life is due to the destruction by the chlorine dioxide of the agents, such as various bacteria which attack the polymers and starches.

The following are examples which show the advantages of using stabilized aqueous chlorine dioxide in well fluids to reduce hydrogen sulfide.

RESULTS OF $H_2S$ AND $ClO_2$ EXPERIMENTS

Example 1

$H_2S$ solution was prepared by heating about ½ of the contents of 3 ATTCH-TU-ESS cartridges to produce $H_2S$ gas. The gas was added to 100 ml a 0.2N HCl solution under 6″ of water pressure with gentle agitation. The 100 ml of $H_2S$ solution prepared was diluted to 500 cc with 400 cc deionized water.

The stabilized chlorine dioxide solution was blended by diluting 18.8 cc of 3.15 titration 2% to 1000 ml. The dilution yielded 1000 ml of 384 ppm solution. This solution was used for a source of $ClO_2$ in all experiments. The first set of texts were run at 2pH and 11pH adjusted with $Na_2CO_3$. Tests for hydrogen sulfide indicated that the reaction was complete in 1 to 2 minutes at 2pH and 2-15 hours at 11pH. The exact timing of the reaction with the 11pH experiment was not ascertained because the reaction took place overnight. The 11pH tubes were layered the next morning in a water white layer on the top ⅔ of the solution, then a band of cloudy area about ¼″ thick with a layer of clear yellow on the bottom of the tube. The 2pH test after 15 hours was still clear at both 2pH and 11.5pH the indicated ratio of $ClO_2$ to $H_2S$ was 2-1 to 1-1.

MID RANGE pH TESTS WITH DIFFERENT BUFFERS.

Example 2

Tests were started at 7.2 pH using saturated bicarbonate solution to maintain pH. A solution of approximately 100 ppm $H_2S$ and 150 ppm $ClO_2$ reacted immediately producing a milky solution with 0.0 $H_2S$. The $H_2S$ was determined by Hach's HS-7 test kit.

The same test was repeated at 6.8 to 7.2 pH adjusted with NaOH. with the same results as the sodium bicarbonate test.

The third trial was run at 9.0 pH adjusted with $Na_2CO_3$ The reaction proceeded at a slower rate at 9 pH. But after 3 minutes there was only 3 ppm $H_2S$ present by test and no $H_2S$ was indicated after 1 hour of reaction time.

There were problems in measuring the $H_2S$ present in the stock solution with the Hach HS-6 test kit. The colors produced in the two comparison tubes were different. No accurate determinations could be made with the HS-6 kit.

Several tests at differing stock solutions dilutions were run to determine the concentration of the $H_2S$ stock solution with the HS-7 kit. The stock solution was determined to be approximately 90 ppm in several tests.

Test tubes were prepared at varying concentrations of $H_2S$ to $ClO_2$. The ratios ran from 1-3 to 1 to 0.5. $H_2S$ to $ClO_2$. All samples were run at 7 to 8 pH buffered with bicarbonate of soda. All tests ran to completion in less than 2 minutes. After the reaction was complate the reaction materials were analyzed for $ClO_2$ residual. The indicated reaction ratio was 1 ppm $H_2S$ per every 0.5 ppm $ClO_2$.

CONCLUSION

It appears that stabilized $ClO_2$ is a useful product for elimination of $H_2S$ from water systems. The production of insoluable collodial sulfur is a product of this reaction.

Thus, the method for reducing hydrogen sulfide concentrations in well fluids of the present invention is well adapted to attain the objects and advantages mentioned as well as those inherent therein. While presently preferred embodiments of the invention have been described for the purpose of this disclosure, numerous changes in the steps of the method and the elements in the method can be made by those skilled in the art, which changes are encompassed within the spirit of this invention as defined by the appended claims.

The foregoing disclosure and the examples are merely illustrative of the principles of this invention and are not to be interpreted in a limiting sense.

What is claimed is:

1. A method of reducing hydrogen sulfide in subterranean well fluids, comprising the steps of:
    forming a treating fluid which comprises a stabilized, aqueous chlorine dioxide solution including potential chlorine dioxide and wherein said solution comprises chlorine dioxide gas reacted with a solution of sodium percarbonate and hydrogen peroxide; and
    introducing said treating fluid into said subterranean well fluids such that hydrogen sulfide in said well fluids is reduced.

2. The method of claim 1 wherein said potential chlorine dioxide is present in said stabilized chlorine dioxide solution in the range of about 2% to about 6% by weight of said stabilizied chlorine dioxide solution.

3. A method of reducing hydrogen sulfide in subterranean well fluids, comprising the steps of:
    forming a treating fluid which comprises a stabilized, aqueous chlorine dioxide solution including potential chlorine dioxide and wherein said solution comprises chlorine dioxide reacted with a solution of sodium perborate and hydrogen peroxide; and
    introducing said treating fluid into said subterranean well fluids such that hydrogen sulfide in said well fluids is reduced.

4. The method of claim 3 wherein potential chlorine dioxide is present in said stabilized chlorine dioxide solution in the range of about 4% to about 6% by weight of said stabilized chlorine dioxide solution.

5. A method of reducing hydrogen sulfide in drilling mud which is brought to the surface in the process of drilling subterranean wells for hydrocarbons comprising the steps of:
    preparing a stabilized chlorine dioxide solution having potential chlorine dioxide present in said solution in the range of about 2% to about 6% by weight of said solution;
    determining the approximate amount of hydrogen sulfide which might be brought to the surface in said drilling mud; and
    introducing said stabilized chlorine dioxide solution into said drilling mud to form a drilling mud composition having at least one mole of potential chlorine dioxide present in said drilling mud composition for each mole of hydrogen sulfide determined in said concentration determining step.

6. The method of claim 5 wherein said stabilized chlorine dioxide is prepared by heating an aqueous solution of chlorine dioxide and a hydrogen peroxide compound to a temperature range sufficiently high to drive off any free peroxide in the solution but too low to drive off the chlorine dioxide, and maintaining the solution at a temperature within said range until substantially all the free peroxide is driven off.

7. The method of claim 5 wherein said stabilized chlorine dioxide is prepared by adding separately to water (1) a source of active oxygen selected from the group consisting of ozone, hydrogen peroxide, calcium magnesium, sodium and urea peroxide and alkali metal perborate, persulfate and perphosphate and (2) a salt of the group consisting of alkali metal carbonate and bicarbonate and alkali metal borate, sulfate and phosphate, and (3) chlorine dioxide gas substantially free from chlorine, said chlorine dioxide gas being added by bubbling it through said solution, the amount of active oxygen in said source being substantially less than 0.2 part by weight per part of said salt.

8. A method of reducing hydrogen sulfide in drilling mud which is brought to the surface in the process of drilling a subterranean well, comprising the steps of:
    preparing a stabilized chlorine dioxide solution having potential chlorine dioxide present in said solution in the range of about 2% to about 6% by weight of said solution;
    determining the approximate rate at which hydrogen sulfide is being added to said drilling mud in said subterranean well; and
    introducing said stabilized chlorine dioxide solution into said drilling mud at a rate such that at least 1 mole of potential chlorine dioxide is present in said drilling mud for each mole of hydrogen sulfide determined to be added to said mud in said rate determining step.

9. The method of claim 8 wherein said stabilized chlorine dioxide is prepared by heating an aqueous solution of chlorine dioxide and a hydrogen peroxide compound to a temperature range sufficiently high to drive off any free peroxide in the solution but too low to drive off the chlorine dioxide, and maintaining the solution at a temperature within said range until substantially all the free peroxide is driven off.

10. The method of claim 8 wherein said stabilized chlorine dioxide is prepared by adding separately to water (1) a source of active oxygen selected from the group consisting of ozone, hydrogen peroxide, calcium magnesium, sodium and urea peroxide and alkali metal perborate, persulfate and perphosphate and (2) a salt of the group consisting of alkali metal carbonate and bicarbonate and alkali metal borate, sulfate and phosphate, and (3) chlorine dioxide gas substantially free from chlorine, said chlorine dioxide gas being added by bubbling it through said solution, the amount of active oxygen in said source being substantially less than 0.2 part by weight per part of said salt.

11. A method of reducing hydrogen sulfide in subterranean well fluids, comprising the steps of:
    determining the approximate amount of hydrogen sulfide in said well fluids; and introducing a stabilized chlorine dioxide solution, including potential chlorine dioxide wherein said solution comprises chlorine dioxide gas reacted with a solution of sodium percarbonate and hydrogen peroxide, into said well fluids in an amount such that at least one mole of potential chlorine dioxide is added for each mole of hydrogen sulfide determined to be present in said well fluid.

12. The method of claim 11 wherein said potential chlorine dioxide is present in said stabilized chlorine dioxide solution in the range of about 2% to about 6% by weight of said stabilized chlorine dioxide solution.

* * * * *